(12) United States Patent
Katsumata et al.

(10) Patent No.: US 8,640,766 B2
(45) Date of Patent: Feb. 4, 2014

(54) HEAT EXCHANGER TUBE

(75) Inventors: Masaya Katsumata, Susono (JP); Yasunori Hyogo, Izu (JP)

(73) Assignee: Mitsubishi Aluminum Co., Ltd., Tokyo (JP)

( * ) Notice: Subject to any disclaimer, the term of this patent is extended or adjusted under 35 U.S.C. 154(b) by 154 days.

(21) Appl. No.: 12/690,685

(22) Filed: Jan. 20, 2010

(65) Prior Publication Data

US 2010/0116472 A1    May 13, 2010

Related U.S. Application Data

(63) Continuation-in-part of application No. 11/218,595, filed on Sep. 6, 2005, now abandoned, which is a continuation of application No. 10/823,563, filed on Apr. 14, 2004, now abandoned.

(30) Foreign Application Priority Data

May 6, 2003   (JP) ................................. 2003-128170

(51) Int. Cl.
   *B23K 35/22*   (2006.01)
   *B23K 35/36*   (2006.01)

(52) U.S. Cl.
   USPC ......................................... 165/133; 228/183

(58) Field of Classification Search
   None
   See application file for complete search history.

(56) References Cited

U.S. PATENT DOCUMENTS

| 4,645,119 | A | 2/1987 | Haramaki et al. |
| 4,906,307 | A | 3/1990 | Fujiyoshi |
| 4,991,647 | A | 2/1991 | Kawabe et al. |
| 5,232,788 | A | 8/1993 | Timsit et al. |
| 5,418,072 | A | 5/1995 | Baldantoni et al. |
| 5,544,698 | A | 8/1996 | Paulman |
| 5,771,962 | A | 6/1998 | Evans et al. |
| 5,785,770 | A | 7/1998 | Meshri et al. |

(Continued)

FOREIGN PATENT DOCUMENTS

| DE | 197 44 734 A1 | 4/1999 |
| DE | 10 2008 009 695 A1 | 9/2008 |

(Continued)

OTHER PUBLICATIONS

Website page found at: http://www.aluminium-brazing.com/sponsor/nocolok/Files/PDFs/31360.pdf graphically depicting particle size distribution in Nocolok Sil Flux.*

(Continued)

*Primary Examiner* — Allen Flanigan
(74) *Attorney, Agent, or Firm* — Oblon, Spivak, McClelland, Maier & Neustadt, L.L.P.

(57) ABSTRACT

A heat exchanger tube comprising an Al alloy extruded tube, and a flux layer including Si powder, Zn-containing flux, and binder formed on an outer surface of the Al alloy extruded tube, wherein an amount of the Si powder applied on the Al alloy extruded tube is in a range of 1 g/m$^2$ or more and 5 g/m$^2$ or less, an amount of the Zn containing flux applied on the Al alloy extruded tube is in a range of 3 g/m$^2$ or more and 20 g/m$^2$ or less, and the Si powder has a particle diameter distribution such that 99% particle diameter is 5 μm or more and 20 μm or less, and an amount of coarse particle having a diameter of not smaller than 5 times ($D_{99}$) is less than 1 ppm by volume.

4 Claims, 1 Drawing Sheet

(56) References Cited

U.S. PATENT DOCUMENTS

| | | | |
|---|---|---|---|
| 6,132,532 A | 10/2000 | Shepelev et al. | |
| 6,153,021 A | 11/2000 | Suzuki et al. | |
| 6,234,377 B1 | 5/2001 | Teshima et al. | |
| 6,352,789 B1 | 3/2002 | Hurd et al. | |
| 6,432,221 B1 | 8/2002 | Seseke-Koyro et al. | |
| 6,648,214 B1 | 11/2003 | Sucke | |
| 6,753,094 B1 | 6/2004 | Wittebrood | |
| 2003/0051342 A1* | 3/2003 | Hasegawa et al. | 29/890.03 |
| 2005/0006065 A1 | 1/2005 | Katsumata et al. | |
| 2006/0000586 A1 | 1/2006 | Katsumata et al. | |
| 2008/0047683 A1 | 2/2008 | Takahashi | |
| 2009/0233118 A1 | 9/2009 | Katoh et al. | |
| 2010/0051247 A1 | 3/2010 | Sogabe et al. | |
| 2010/0116472 A1 | 5/2010 | Katsumata et al. | |

FOREIGN PATENT DOCUMENTS

| | | |
|---|---|---|
| EP | 0 847 830 A2 | 6/1998 |
| EP | 1 287 934 A1 | 3/2003 |
| EP | 1 475 598 | 11/2004 |
| EP | 1 475 598 A2 | 11/2004 |
| EP | 1 533 070 A1 | 5/2005 |
| JP | 61-293699 | 12/1986 |
| JP | 1-225736 | 9/1989 |
| JP | 5-25576 | 2/1993 |
| JP | 7-227695 | 8/1995 |
| JP | 7-303858 | 11/1995 |
| JP | 10-34375 | 2/1998 |
| JP | H10-34375 | 2/1998 |
| JP | 11-335764 | 12/1999 |
| JP | 11-347783 | 12/1999 |
| JP | 2000-63970 | 2/2000 |
| JP | 3160099 | 4/2001 |
| JP | 3212927 | 9/2001 |
| JP | 2002-79370 | 3/2002 |
| JP | 2002-079370 | 3/2002 |
| JP | 2003-94165 | 4/2003 |
| JP | 2003-94165 A | 4/2003 |
| JP | 2004-330233 | 11/2004 |
| JP | 2006-255755 | 9/2006 |
| JP | 2007-275898 | 10/2007 |
| JP | 2009-106947 | 5/2009 |
| JP | 2009106947 A * | 5/2009 |
| JP | 2009-184017 | 8/2009 |
| WO | WO 93/15871 | 8/1993 |
| WO | WO 00/38874 | 7/2000 |

OTHER PUBLICATIONS

Website page found at: http://www.aluminium-brazing.com/2010/10/ discussing silicone particle size distribution in Nocolok Sil Flux.*
Submission by the Opponents, Erbslöh Aluminium GmbH and Valeo Systèmé Thermiques, filed against the Response by the Patentee, Mitsubishi Aluminium Co., Ltd., in European Patent Application No. 04009965.7/EP 1475598, filed Apr. 27, 2004, on May 12, 2010 (with English translation).
Submission by the Opponent, Valeo Systèmes Thermiques, filed against the Response by the Patentee, Mitsubishi Aluminium Co., in European Patent Application No. 04009965.7/EP 1475598, filed Apr. 27, 2004, on May 28, 2010 (with English translation).
Submission (Statement and Amendment filed Jan. 7, 2010) by the Patentee, Mitsubishi Aluminium Co., in European Patent Application No. 04009965.7/EP 1475598, filed Apr. 27, 2004, on Jan. 18, 2010.
Submission (Notice of Opposition) by the Opponent, Valeo Systèmes Thermiques, against the Patentee, Mitsubishi Aluminium Co., in European Patent Application No. 04009965.7/EP 1475598, filed Apr. 27, 2004, on Oct. 13, 2009.
Communication (Notice of Opposition) issued Aug. 28, 2009, in European Patent Application No. 04009965.7/EP 1475598, filed Apr. 27, 2004.
Submission (Letter filed Aug. 11, 2009) by the Patentee, Mitsubishi Aluminium Co., in European Patent Application No. 04009965.7/EP 1475598, filed Apr. 27, 2004, on Aug. 21, 2009.
Communication (Indication of Deficiencies in the Notice of Opposition) issued Aug. 12, 2009, in European Patent Application No. 04009965.7/EP 1475598, filed Apr. 27, 2004.
Submission (Notice of Opposition filed Jul. 22, 2009) by the Opponent, Valeo Système Thermiques, against the Patentee, Mitsubishi Aluminium Co., Ltd., in European Patent Application No. 04009965.7/EP 1475598, filed Apr. 27, 2004, on Aug. 5, 2009, (with English translation), was previously filed in an Information Disclosure Statement on Apr. 20, 2010.
Payment by the Opponent, Valeo Systèmes Thermiques, in relation to the opposition proceeding against the Patentee, Mitsubishi Aluminium Co., in European Patent Application No. 04009965.7/EP 1475598, filed Apr. 27, 2004, on Jul. 22, 2009.
Submission (Letter filed May 7, 2009) by the Patentee, Mitsubishi Aluminium Co., in European Patent Application No. 04009965.7/EP 1475598, filed Apr. 27, 2004, on May 15, 2009.
Submission (Notice of Opposition) filed by the Opponent, Erbslöh Aluminium GmbH, against the Patentee, Mitsubishi Aluminium Co., Ltd., in European Patent Application No. 04009965.7/EP 1475598, filed Apr. 27, 2004, on Apr. 29, 2009 (with English translation), was previously filed in an Information Disclosure Statement on Apr. 20, 2010.
Communication (Decision to Grant) issued Sep. 25, 2008, in European Patent Application No. 04009965.7/EP 1475598, filed Apr. 27, 2004.
Communication (Letter from Attorney relating to German and French translations of claims) issued Sep. 17, 2008, in European Patent Application No. 04009965.7/EP 1475598, filed Apr. 27, 2004.
Communication (under Rule 71(3) EPC with an adopted document) issued May 7, 2008, in European Patent Application No. 04009965.7/EP 1475598, filed Apr. 27, 2004.
Communication (Minutes of the Oral Proceedings before the Examining Division) issued Apr. 28, 2008, in European Patent Application No. 04009965.7/EP 1475598, filed Apr. 27, 2004.
Submission (Amendment on Oral Proceedings) by the Patentee, Mitsubishi Aluminium Co., in European Patent Application No. 04009965.7/EP 1475598, filed Apr. 27, 2004, on Apr. 10, 2008.
Solvay Fluor, "NOCOLOK® Sil Flux (fine grade)" cited in the Minutes of the Oral Proceedings before the Examining Division conducted on Apr. 10, 2008, 1 page.
Submission (Response) by the Patentee, Mitsubishi Aluminium Co., in European Patent Application No. 04009965.7/EP 1475598, filed Apr. 27, 2004, on Mar. 10, 2008.
Postage Record (Acknowledgement of Receipt) by the Patentee's Representative, Hoffman Eitle, in European Patent Application No. 04009965.7/EP 1475598, filed Apr. 27, 2004, on Nov. 27, 2007.
Communication (Summons) issued Nov. 26, 2007, in European Patent Application No. 04009965.7/EP 1475598, filed Apr. 27, 2004.
Submission (Response) by the Patentee, Mitsubishi Aluminium Co., in European Patent Application No. 04009965.7/EP 1475598, filed Apr. 27, 2004, filed on Oct. 22, 2007.
Communication (Office Action) issued Jun. 12, 2007, in European Patent Application No. 04009965.7/EP 1475598, filed Apr. 27, 2004.
Submission (Amendment and Response) by the Patentee, Mitsubishi Aluminium Co., in European Patent Application No. 04009965.7/EP 1475598, filed Apr. 27, 2004, filed on Dec. 11, 2006.
Communication (Office Action) issued Aug. 1, 2006, in European Patent Application No. 04009965.7/EP 1475598, filed Apr. 27, 2004.
Submission (Request to Proceed with Examination) by the Patentee, Mitsubishi Aluminium Co., in European Patent Application No. 04009965.7/EP 1475598, filed Apr. 27, 2004, filed on Jun. 14, 2006.
Communication (Invitation for further Examination) issued May 9, 2006, in European Patent Application No. 04009965.7/EP 1475598, filed Apr. 27, 2004.
Communication (Search Report) issued Mar. 21, 2006, in European Patent Application No. 04009965.7/EP 1475598, filed Apr. 27, 2004.
Communication (Notification of Application Number) issued Sep. 29, 2004, in European Patent Application No. 04009965.7/EP 1475598, filed Apr. 27, 2004.
Communication (JP Priority document received and placed in EP file) issued Jun. 8, 2004, in European Patent Application No. 04009965.7/EP 1475598, filed Apr. 27, 2004.

(56) References Cited

OTHER PUBLICATIONS

Submission (Patent Application filed Apr. 5, 2004) by the Patentee, Mitsubishi Aluminium Co., in European Patent Application No. 04009965.7/EP 1475598, on Apr. 27, 2004.
"Aluminum-Magnesium-Silicon (6000) Alloys", c. 2001-2003 Article 74 from the Key-to-Metals.com website, found at: http://www.key-to-metals.com/Article74.htm.
J.R. Davis, "Aluminum and Aluminum Alloys", Table form the third edition of ASM Specialty Handbook, ASM International, 1993, pp. 1-2 and 1.
Ed J. Morley, "Cladless Brazing of Aluminium", $2^{nd}$ International Congress Aluminium Brazing, May 15-17, 2002, pp. 1-2 (cover page).
International Search Report issued Apr. 19, 2011, in Patent Appication No. PCT/JP2011/050832.

\* cited by examiner

HEAT EXCHANGER TUBE

CROSS-REFERENCE TO RELATED APPLICATIONS

This application is continuation in part of application Ser. No. 11/218,595, filed on Sep. 6, 2005, which is a continuation of application Ser. No. 10/823,563, filed on Apr. 14, 2004, which claims priority to Japanese Patent Application No. JP 2003-128170, filed on May 6, 2003, the entire contents of each of which are incorporated herein by reference.

BACKGROUND OF THE INVENTION

1. Field of the Invention

The present invention relates to a heat exchanger tube and, more particularly, relates to a heat exchanger tube having high corrosion resistance.

As shown in FIG. 2, a heat exchanger generally comprises a pair of right and left pipe bodies called header pipes 5, a multitude of tubes 1 made of an aluminum alloy installed in parallel at intervals from each other between the header pipes 5, and fins 6 installed between the tubes 1, 1. The inner space of each of the tubes 1 and the inner space of the header pipes 5 communicate with each other, so as to circulate a medium through the inner space of the header pipes 5 and the inner space of each of the tubes 1, thereby achieving efficient heat exchange via the fins 6.

It is known to constitute the tubes 1 of the heat exchanger from heat exchanger tubes 11 made by coating the surface of an Al alloy extruded tube 3, that has flattened cross section and a plurality of holes 4 for passing the medium as shown in perspective view of FIG. 1, with a flux containing a brazing material powder so as to form a flux layer 2. It is also known to make the Al alloy extruded tube 3 from material (JIS1050) that has high workability for extrusion forming process, and to use a Si powder, an Al—Si alloy powder or an Al—Si—Zn alloy powder as the brazing material contained in the flux layer 2.

A heat exchanger is manufactured using the conventional heat exchanger tube 11 described above in a process such as: the heat exchanger tubes 11 are installed at right angles to the header pipes 5 that are disposed in parallel at a distance from each other, ends of the heat exchanger tubes 11 are inserted into openings (not shown) that are provided in the side face of the header pipe 5, the fins 6 having corrugated shape are assembled between the heat exchanger tubes 11, and the assembly is heated in a heating furnace so that the header pipes 5 and the tubes 1 are fastened to each other by brazing with the brazing material provided on the heat exchanger tube 11 while the fins 6 of corrugated shape are fastened between the tubes 1, 1 by brazing.

Wall thickness of the tube 1 that constitutes the heat exchanger is made smaller than that of the header pipe 5 in order to achieve high efficiency of heat exchange. As a result, in the case in which the tube and the header pipe are corroded at comparable rates, it is likely that a penetrating hole will be formed by corrosion first in the tube thereby allowing the medium to leak therethrough. Thus, it has been a major concern in the heat exchanger to prevent corrosion of the tubes.

In order to improve the corrosion resistance of the heat exchanger tube 11, a sacrificial anode layer containing Zn as a major component is formed on the surface of the tubes in the conventional heat exchangers. As the process to form the sacrificial anode layer, such processes are known as thermal spraying of Zn and coating with a Zn-containing flux. Japanese Patent Application Unexamined Publication No. 7-227695 discloses an example that employs Zn-containing flux.

However, when forming the sacrificial anode layer by thermal spraying, it is difficult to precisely control the amount of metal applied by thermal spraying, thus leading to such a problem that the sacrificial anode layer cannot be formed uniformly on the tube surface, and the corrosion resistance of the tube cannot be improved.

When the Zn-containing flux described in Japanese Patent Application Unexamined Publication No. 7-227695 as mentioned above is used, it may be believed that corrosion resistance of the tube can be improved since the flux and Zn are supplied simultaneously onto the tube surface. In actuality, however, it is difficult to achieve a stable coating condition with ordinary coating methods such as immersion coating and roll coating, and therefore it has been difficult to uniformly apply the Zn-containing flux. As a result, Zn distribution in the sacrificial anode layer becomes uneven, thus leading to insufficient corrosion resistance of the tubes with preferential corrosion occurring in a portion that has higher concentration of Zn.

SUMMARY OF THE INVENTION

The present invention, which has been completed in view of the background described above, has an object of providing a heat exchanger tube that has higher corrosion resistance.

In order to achieve the object described above, the present invention employs the following constitution.

The heat exchanger tube of the present invention comprises an Al alloy extruded tube, and a flux layer containing a Si powder and a Zn-containing flux formed on the external surface of the Al alloy extruded tube, wherein an amount of the Si powder applied to the Al alloy extruded tube is not less than 1 $g/m^2$ and not more than 5 $g/m^2$, and an amount of the Zn-containing flux applied to the Al alloy extruded tube is not less than 5 $g/m^2$ and not more than 20 $g/m^2$.

The Zn-containing flux preferably contains at least one Zn compound selected from $ZnF_2$, $ZnCl_2$ and $KZnF_3$.

When such a heat exchanger tube is used, since a mixture of the Si powder and the Zn-containing flux is applied, the Si powder melts and turns into a brazing liquid during a brazing process, and Zn contained in the flux is diffused uniformly in the brazing liquid and is distributed uniformly over the tube surface. Since the diffusion velocity of Zn in a liquid phase such as the brazing liquid is significantly higher than the diffusion velocity in the solid phase, Zn concentration in the tube surface becomes substantially uniform, thus making it possible to form a uniform sacrificial anode layer and improve the corrosion resistance of the heat exchanger tube.

It is preferable for maximum particle size of the Si powder to be 30 μm or less. Maximum particle size larger than 30 μm results in an increase in the erosion depth of the tube and is therefore not desirable. When maximum particle size of the Si powder is less than 0.1 μm, Si particles clump, and the erosion depth of the tube increases also in this case. Therefore, the maximum particle size is preferably not less than 0.1 μm.

The Al alloy extruded tube is preferably made of an Al alloy containing Si and Mn, with the balance being Al and inevitable impurities, while a Si content is 0.5% by weight or more and 1.0% by weight or less, and a Mn content is 0.05% by weight or more and 1.2% by weight or less.

As an another aspect of the present invention, a heat exchanger tube may comprise an Al alloy extruded tube, and a flux layer including a Si powder, a Zn-containing flux, and a binder formed on an outer surface of the Al alloy extruded tube, wherein an amount of the Si powder applied on the Al alloy extruded tube is in a range of 1 g/m² or more and 5 g/m² or less, an amount of the Zn containing flux applied on the Al alloy extruded tube is in a range of 3 g/m² or more and 20 g/m² or less, and the Si powder has a particle diameter distribution such that 99% particle diameter ($D_{99}$) is 5 µm or more and 20 µm or less, and an amount of coarse particles having diameters of not smaller than 5 times ($D_{99}$) is less than 1 ppm by volume. Here ($D_{99}$) denotes a critical diameter defined such that cumulative volume of particles not larger than ($D_{99}$) constitute 99% by volume of all the particles.

Preferably, in the above-described heat exchanger tube, 50% particle diameter ($D_{50}$) of the Si powder is ($D_{99}$)×0.05 or more and ($D_{99}$)×0.7 or less, where ($D_{50}$) denotes a critical diameter defined such that cumulative volume of particles not larger than ($D_{50}$) constitute 50% by volume of all the particles.

In the above-described heat exchanger tube, the Zn-containing flux may contain at least one selected from $ZnF_2$, $ZnCl_2$, and $KZnF_3$.

The Al alloy extruded tube of the above-described heat exchanger tube may be constituted of an alloy containing Si of 0.05% or more and 1.0% or less by weight, Mn of 0.05% or more and 1.2% or less by weight, and the balance being consisting of Al and inevitable impurities.

DETAILED DESCRIPTION OF THE INVENTION

Figure 1:
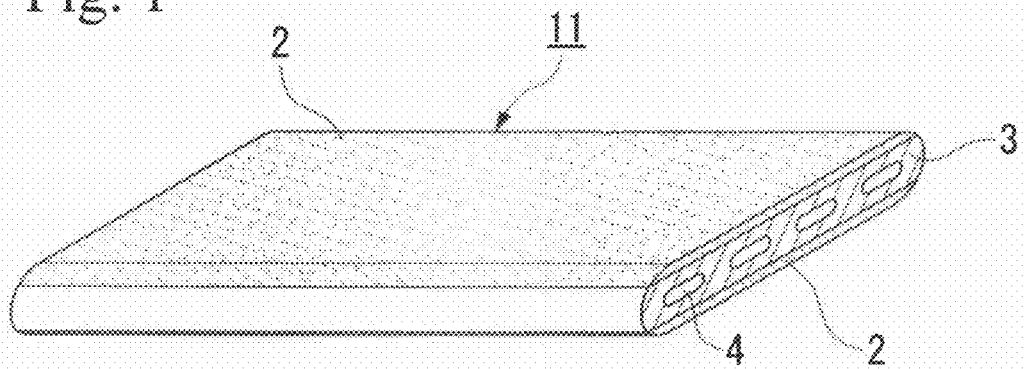
FIG. 1 is a perspective view of a heat exchanger tube of the prior art.
Figure 2:
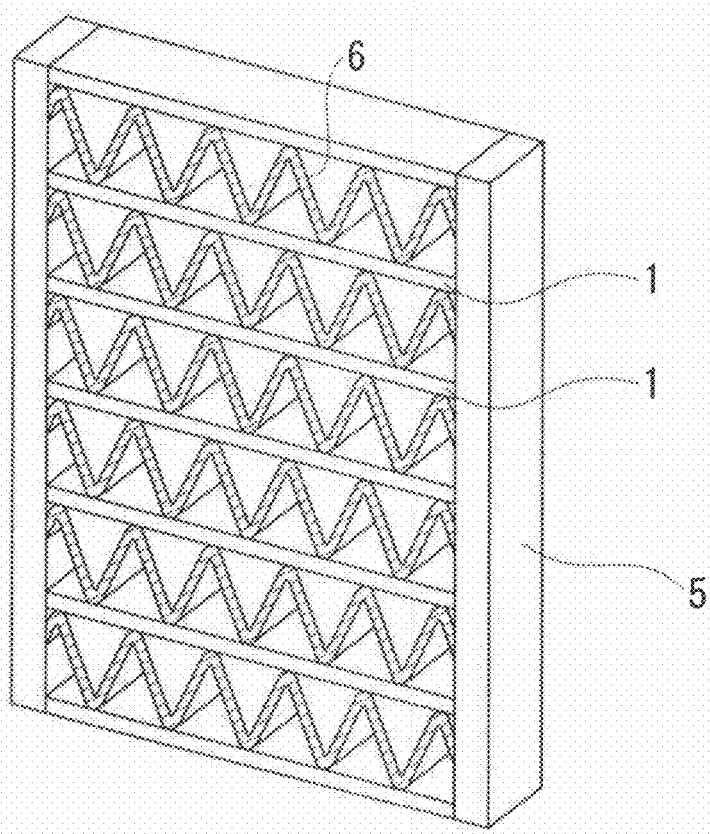
FIG. 2 is a perspective view of a heat exchanger of the prior art.

Next, preferred embodiments of the present invention will be described in detail.

The heat exchanger tube of the present invention is made by forming the external surface of an Al alloy extruded tube with a flux layer containing a Si powder and a Zn-containing flux.

The Al alloy extruded tube which constitutes the heat exchanger tube is made of an Al alloy containing Si and Mn, with the balance being Al and inevitable impurities, where a Si content is 0.5% by weight or more and 1.0% by weight or less, and a Mn content is 0.05% by weight or more and 1.2% by weight or less.

The reason for restricting the composition of the Al alloy extruded tube will be described below. Si has an effect in that a large amount of Si forms a solid solution in the Al alloy extruded tube, thus resulting in noble potential of the Al alloy extruded tube, and causes preferential corrosion to occur in the header pipes and the fins that are brazed with the tubes when assembling the heat exchanger, thereby suppressing deep pitting corrosion from occurring in the Al alloy extruded tube, while improving the brazing characteristic and forming good joint thereby to improve the strength after brazing. Si content of less than 0.5% cannot achieve the desired effect, and is therefore not desirable. Si content higher than 1.0%, on the other hand, lowers the melting point of the alloy resulting in excessive melting during brazing and poor extrusion forming characteristic, and is not desirable. Therefore, Si concentration in the Al alloy extruded tube is set in a range from 0.5 to 1.0%. More preferable range of Si concentration is from 0.6% to 0.8%.

Mn has the effect of turning the Al alloy extruded tube to noble potential and, because of less likelihood of diffusing in the brazing material, allows higher potential difference with the fin or the header pipe so as to make the corrosion preventing effect of the fin or the header pipe more effective, thereby improving the external corrosion resistance and the strength after brazing. Mn content of less than 0.05% cannot achieve sufficient effect of turning the Al alloy extruded tube to noble potential, and is therefore not desirable. Mn content higher than 1.2%, on the other hand, results in poor extrusion forming characteristic, and is not desirable.

Therefore, Mn concentration in the Al alloy extruded tube is set in a range from 0.05 to 1.2%.

The flux layer formed on the tube surface contains the Zn-containing flux and the Si powder, so that a molten brazing material layer is formed over the entire surface of the tube after brazing. Since the brazing material layer contains Zn uniformly distributed therein, the brazing material layer has similar effect as that of the sacrificial anode layer so that the brazing material layer is subject to preferential planar corrosion. Therefore deep pitting corrosion can be suppressed and corrosion resistance can be improved.

The amount of a Si powder applied to the heat exchanger tube is preferably not less than 1 g/m² and not more than 5 g/m². When the amount is less than 1 g/m², sufficient brazing strength cannot be achieved because of insufficient amount of the brazing material, and sufficient diffusion of Zn cannot be achieved. When the amount is more than 5 g/m², Si concentration in the tube surface increases and the rate of corrosion increases, and is therefore not desirable.

The flux layer contains at least the Zn-containing flux. In addition to the Zn-containing flux, a flux which does not contain Zn may also be contained.

The Zn-containing flux preferably contains at least one Zn compound selected from $ZnF_2$, $ZnCl_2$ and $KZnF_3$. The flux which does not contain Zn preferably contains at least one fluoride such as LiF, KF, $CaF_2$, $AlF_3$ or $SiF_4$ or a complex compound of the fluoride such as $KAlF_4$ or $KAlF_3$.

As the Zn-containing flux is contained in the flux layer of the heat exchanger tube, a Zn-diffused layer (brazing material layer) is formed on the tube surface after brazing, so that the Zn-diffused layer functions as a sacrificial anode layer, thereby improving the anti-corrosion effect of the tube.

Also, because a mixture of the Si powder and the Zn-containing flux is applied, the Si powder melts and turns into a brazing liquid during a brazing process, Zn contained in the flux is diffused uniformly in the brazing liquid and is distributed uniformly over the tube surface. Since diffusion velocity of Zn in a liquid phase such as the brazing liquid is significantly faster than the diffusion velocity in a solid phase, Zn concentration in the tube surface becomes substantially uniform, thus making it possible to form a uniform Zn-diffused layer and improve the corrosion resistance of the heat exchanger tube.

The amount of the Zn-containing flux applied to the heat exchanger tube is not less than 5 g/m² and not more than 20 g/m². An amount of less than 5 g/m² results in insufficient formation of a Zn-diffused layer that does not have sufficient anti-corrosion effect, and is therefore not desirable. An amount of more than 20 g/m² causes excessive Zn to be concentrated in a fillet that is the joint of the fin with other components which results in higher rate of corrosion in the joint, and is therefore not desirable.

The heat exchanger can be constituted by brazing the heat exchanger header pipes and the fins to the heat exchanger tube described above.

That is, the heat exchanger is constituted from the heat exchanger tube of the present invention, the heat exchanger header pipes and the fins that are joined with each other.

Similarly to the heat exchanger described in conjunction with the prior art, the heat exchanger comprises a pair of right and left pipe bodies called "heat exchanger header pipes", a plurality of heat exchanger tubes installed in parallel at intervals from each other between the heat exchanger header pipes, and fins installed between the heat exchanger tubes. The inner space of the heat exchanger tube and the inner space of the heat exchanger header pipe are communicated with each other, so as to circulate a medium through the inner space of the heat exchanger header pipe and the inner space of the heat exchanger tube, thereby to achieve efficient heat exchange via the fins.

Second Embodiment

In the following, another embodiment according to the present invention is explained.

A heat exchanger tube of this embodiment is also constituted by forming a flux layer which includes Si powder and Zn-containing flux on an outer surface of an Al-alloy extruded tube (tube main body). In this embodiment, the flux layer further contains binder.

A main body of the heat exchanger tube may be constituted of aluminum extruded tube or of aluminum alloy extruded tube.

The component of the Al alloy extruded tube may contains Si, Mn, and the balance being Al and inevitable impurities, where an amount of Si may be 0.05% by weight or more and 1.0% by weight or less, an amount of Mn may be 0.05% by weight or more and 1.2% by weight or less.

In the production process of a heat exchanger, it is preferable to constitute fins of a material (fin member) that has electric potential lower (less noble) than that of the tube.

In the following, reasons for limiting component elements of the heat exchanger tube is explained.

Content of Si is important for forming moderate diffusion profile, and forming an uniform sacrificial anode layer. Where the amount of Si is less than 0.05% by weight, diffusion profile of Si has a large gradient, and it is difficult to form an uniform sacrificial anode layer. Where the amount of Si is more than 1.0% by weight, melting point of the alloy constituting the tube decreases, and extrudability of the alloy decreases. Therefore, in the present embodiment, the amount of Si contained in the alloy of the tube main body is controlled to be 0.05 to 1.0% by weight. More preferable Si content of the alloy is 0.1 to 0.6% by weight.

Mn forms an intermetallic compound with diffusing Si and is effective in forming an uniform sacrificial anode layer. In addition, Mn is also effective in improving corrosion resistance of the tube, improving mechanical strength of the tube, and improving extrudability of the alloy during forming the tube by extrusion.

Where the amount of Mn in the alloy is less than 0.05% by weight, diffusion profile of the Si has large gradient, and it is difficult to form an uniform sacrificial anode layer. Where the amount of Mn exceeds 1.2% by weight, extrudability of the alloy is decreased because of increasing extrusion pressure. Therefore, in the present embodiment, the amount of Mn contained in the alloy for constituting the tube is controlled to be 0.05 to 1.2% by weight. More preferable Mn content is 0.1 to 0.6% by weight.

Further, the Al alloy constituting the tube may further includes one or more selected from the group consisting of Fe: 0.1 to 0.6% by weight, Ti: 0.005 to 0.2% by weight, and Cu: 0.1% by weight or less.

Fe forms an intermetallic compound with diffusing Si and is effective in forming an uniform sacrificial anode layer. Where the amount of Fe is less than 0.1% by weight, diffusion profile of Si has a large gradient, and it is difficult to form a uniform sacrificial anode layer. Where the amount of Fe exceeds 0.6% by weight, intermetallic compound increases in the alloy constituting the tube, thereby tending to deteriorate the extrudability, resulting in short tool life of an extrusion die. More preferable Fe content is 0.15 to 0.5% by weight.

Ti forms fine intermetallic compound that does not inhibit corrosion resistance, and contributes to enhancement of strength of the tube 3. Where the amount of Ti is less than 0.005% by weight, no effective result can be obtained by the addition of Ti. Where the amount of Ti exceeds 0.2% by weight, extrudability of the tube alloy is deteriorated because of increasing extrusion pressure. More preferable Ti content is 0.005 to 0.1% by weight.

Cu is effective in raising the electric potential of the tube and maintaining the effect of the sacrificial anode layer for a long time. However, where the amount of Cu exceeds 0.1% by weight, corrosion rate increases, and the effect of the sacrificial anode layer is lost in the short time period. More preferable Cu content is less than 0.05% by weight.

The tube main body may be formed by extrusion of aluminum or aluminum alloy of the above-described composition. The extruded tube constituting the tube main body may be formed as a multi bore extruded tube having a plurality of refrigerant passageways.

The extruded tube may have a surface constituted of two substantially flat main surfaces, two side surfaces, and two end surfaces in which opening of the refrigerant passageways are formed. The flux layer may be formed on the two main surfaces and the two side surfaces, or only on the two main surfaces.

Preferably, surface roughness of the extruded tube (tube main body) is less than 20 μm in $R_{max}$.

The flux layer formed on the surface of the tube includes Zn-containing flux, Si powder, and binder.

Preferably, the Zn containing flux contains one or more Zn compound selected from the group consisting of $ZnF_2$, $ZnCl_2$, and $KZnF_3$. The Zn containing flux may be consisting of the above-described Zn compound. Alternatively, the Zn-containing flux may be a mixture of the above-described Zn compound and another flux. For example, one or two or more selected from the group consisting of LiF, KF, $CaF_2$, $AlF_3$, $SiF_4$, $K_{1-3}AlF_{4-6}$, $Cs_{1-3}AlF_{4-6}$, $Cs_{0.02}K_{1-2}AlF_{4-5}$, $K_2SiF_6$ may be included in the Zn containing flux. Preferably, the Zn containing flux may have a particle diameter of 1 to 6 μm in mean particle diameter ($D_{50}$).

Where the Zn containing flux is formed as a mixture of Zn compound and Zn-free flux, it is preferable to control the amount of Zn compound applied on the tube surface to be 3 g/m² or more.

Acrylic based resin may be used as the binder. Where the acrylic based resin is used as the binder, the resin has an effect of adhering the components of the flux layer such as Si powder and fluoride based flux to the surface of the tube, and preventing delamination of the flux layer from the tube during the pre-brazing process such as assembling process of the heat exchanger. In addition, since the acrylic based resin is easily decomposed and evaporated during heating in the process of brazing, brazability and corrosion resistance of the tube are not deteriorated. Therefore, the acrylic based resin is preferred as the binder.

In the present embodiment, 99% particle size ($D_{99}$) of the Si powder contained in the flux layer is preferably 5 μm or more and 20 μm or less, where 99% particle diameter denotes a critical diameter defined such that cumulative volume of particles having the diameters of not greater than the diameter constitute 99% of the volume of the whole powder. Further, amount of coarse particles having a particle diameter (here-after referred to as $D_{coarse}$) of not smaller than $(D_{99}) \times 5$ is preferably less than 1 ppm by volume.

Where the Si powder has a particle size of 20 µm or less in 99% particle diameter ($D_{99}$), it is possible to form an uniform sacrificial anode layer. On the other hand, where 99% particle diameter exceeds 20 µm, localized deep erosion is generated, and it is difficult to form a uniform sacrificial anode layer. Therefore, particle diameter of Si powder is preferably 20 µm or less in 99% particle diameter ($D_{99}$). Where the Si powder has a particle diameter of less than 5 µm in 99% particle diameter ($D_{99}$), Si powder as a whole has fine particle diameter. Since the fine Si particle tends to accumulate with each other, granulation or aggregation of powder particles easily occurs in the powdered brazing composition formed by mixing the Si powder, flux, and binder.

More preferably, ($D_{99}$) of the Si powder is 5 µm or more and 15 µm or less.

Based on the above-described reason, the Si powder preferably has a particle diameter distribution such that 99% particle diameter ($D_{99}$) is 5 µm or more and 20 µm or less, and an amount of coarse Si particles of not smaller than 5 times the 99% particle diameter ($D_{99}$) is less than 1 ppm.

More preferably amount of the coarse Si particles of not smaller than 5 times the 99% particle diameter ($D_{99}$) is less than 0.5 ppm, more preferably less than 0.1 ppm.

Preferably, mean diameter ($D_{50}$) of the Si powder is in the range of not smaller than 0.05 times the 99% particle diameter ($D_{99}$) and not larger than 0.7 times the 99% particle diameter ($D_{99}$), where the mean diameter ($D_{50}$) denotes a critical particle diameter defined by the fact that cumulative volume of Si powder of not larger than that diameter constitute 50% by volume of the whole Si powder. Where the Si powder applied on the surface of the tube has a mean diameter ($D_{50}$) of not smaller than 0.05 times the 99% particle diameter ($D_{99}$) and not larger than 0.7 times the 99% particle diameter ($D_{99}$), uniform sacrificial anode layer is formed after the heating in the brazing process. On the other hand, where the Si powder applied on the surface of the tube has a mean diameter ($D_{50}$) larger than 0.7 times the 99%, relatively coarse particles are dispersed on the surface of the tube. As a result, the sacrificial anode layer formed after the brazing tends to have spot like distribution of deep (thick) portions. As a result, area in which Zn is not diffused is distributed between the spot like sacrificial anode layers. In such a case, by a large potential difference between the area of sacrificial anode layer and the area in which Zn is not diffused, there is a possibility of occurrence of localized deep corrosion.

Where the Si powder has a small mean diameter less than 0.05 times ($D_{99}$), granulation tends to occur by accumulation of the fine particles.

Based on the above-explained reason, mean diameter ($D_{50}$) of Si powder is preferably not smaller than 0.05 times the 99% particle diameter ($D_{99}$) and not larger than 0.7 times the 99% particle diameter ($D_{99}$).

Amount of Si powder applied on the surface of the tube (heat exchanger tube) is preferably 1 $g/m^2$ or more and 5 $g/m^2$ or less. Where the amount of Si powder is less than 1 $g/m^2$, brazing filler is not formed sufficiently, and it is difficult to form an uniform sacrificial anode layer. On the other hand, where the amount of Si powder exceeds 5 $g/m^2$, noble cathode layer is formed on the surface of the sacrificial anode layer. As a result, effect of the sacrificial anode layer is lost in a short time period. Therefore, amount of the Si powder in the coating (flux layer) is preferably 1 to 5 $g/m^2$.

The amount of Zn-containing flux applied on the surface of the heat exchanger tube is preferably in the range of 3 $g/m^2$ or more and 20 $g/m^2$ or less. Where the amount of the Zn-containing fluoride based flux in the coating (flux layer) is less than 3 $g/m^2$, it is difficult for the sacrificial anode layer to exert the sacrificial anode effect because of small potential difference. In addition, decomposition and removal of surface oxide layer of the member to be brazed (tube) tends to be insufficient. On the other hand, where the amount of the Zn-containing fluoride based flux in the coating exceeds 20 $g/m^2$, corrosion rate of the sacrificial anode layer is increased because of large potential difference. As a result, corrosion protection effect by the presence of the sacrificial anode layer is lost in a short time.

More preferable amount of the Zn-containing flux is 4 $g/m^2$ or more and 15 $g/m^2$ or less.

In addition to the Si powder and the Zn-containing fluoride based flux, the coating composition includes binder. For example, acrylic base resin may be used as the binder. The binder has an effect of adhering the Si powder and the Zn containing flux (necessary materials in the formation of the sacrificial anode layer) to the surface of the tube. Where the amount of binder in the coating is less than 0.2 $g/m^2$, there is a possibility of failing formation of an uniform sacrificial anode layer by dropping out of the Si powder and/or Zn-containing flux from the tube during the brazing process. On the other hand, where the amount of binder exceeds 8.3 $g/m^2$ by weight, brazability is deteriorated by the presence of residue of the binder, and it is difficult to form an uniform sacrificial anode layer. Therefore, it is preferable to control the amount of the binder in the coating to be in the range of 0.2 to 8.3 $g/m^2$. In usual, the binder is evaporated by heating during the brazing process.

More preferable amount of the binder coated on the surface of the tube is 0.3 $g/m^2$ or more and 7 $g/m^2$ or less. Preferably, the amount of the binder is controlled to be in the range of 5% to 25% or the total amount of the Si powder and the Zn containing flux and binder in the coating.

A heat exchanger may be constituted by brazing headers and fins for heat exchanger to the above-described heat exchanger tube.

A heat exchanger is constituted by joining the above-described tubes, header pipes, and fins. A pair of pipes so called header pipes are arranged with a clearance in between in vertical or lateral (horizontal) direction. A plurality of tubes are arranged between the header pipes. Openings corresponding to the numbers of the tubes are opened in one side of each header pipe. For example, the tubes and header pipes are assembled by inserting the end portions of the tubes into the openings of the header pipes. Plate members so called fins are arranged between each pair of the adjacent tubes. The fin may be a corrugated fins made by working a plate into a corrugated (wavy) shape.

After assembling the tubes, fins, and header pipes, the assembled body is heated at a predetermined temperature, for example, at 580 to 615° C. During the heating, melting of flux is followed by melting of the Si powder, and brazing liquid is formed. The brazing liquid includes Zn of the flux, Si of the silicon powder, and alloy components of the surface portion of the tube main body eutectically molten with the Si powder. The brazing liquid is solidified by cooling and forms a brazing filler layer.

Zn is uniformly distributed by diffusion in the brazing liquid, and also diffuses into the Al alloy of the tube main body. As a result, an uniform Zn diffused layer is formed on the surface of the tube.

In the process of heat exchange, medium is circulated in the inner space of each header pipes and tubes, and heat exchange can be performed effectively via the fins having large contact surfaces with the outer environment.

EXAMPLES

Al alloy extruded tubes having 10 cooling medium passing holes and cross section measuring 20 mm in width, 2 mm in height and wall thickness of 0.20 mm were produced, by extrusion forming of billets made of an Al alloy containing 0.7% by weight of Si and 0.5% by weight of Mn.

Then a flux mixture was prepared by mixing the Zn-containing flux to Si powder. The flux mixture was applied by spraying onto the outer surface of the Al alloy extruded tube that was produced in advance, thereby forming a flux layer. The amounts of the Si powder and the flux mixture applied to the Al alloy extruded tube are shown in Table 1. Thus the heat exchanger tubes of Examples 1 to 6 and Comparative Examples 1 to 4 were produced.

Then fins made of cladding material (JIS3003 or JIS3003/JIS4045) were assembled on the heat exchanger tubes of Examples 1 to 6 and Comparative Examples 1 to 4, and the assemblies were kept at 600° C. in a nitrogen atmosphere for three minutes so as to carry out brazing. The tubes with the fins brazed thereon were subjected to corrosion tests (SWAAT, 20 days) to measure the maximum corrosion depth of the tubes. The test results are shown in Table 1.

resin=2.6:5.7:1.2 (g/m$^2$). Each tube was subjected to heating for brazing at 600° C. for 2.5 minutes in a furnace of nitrogen atmosphere.

Particle diameter distribution of Si powder was controlled as shown in Table 2 by measuring the diameter distribution using the below explained laser diffraction particle diameter analyzer, and grading the particle diameter by sieving.

Method of Controlling the Particle Diameter Distribution of Si Powder.

1. Firstly commercially available Si powder of a predetermined grade is prepared. In this stage, it is impossible to analyze the distribution of coarse grains by the laser diffraction particle diameter analyzer. Commercially available powders are provided with data of particle diameter distribution. However, those powders include substantial amounts of coarse particles not described in the data.
2. The Si powder is sieved using a sieve having a mesh aperture size of $(D_{99}) \times 5$.
3. The powder is subjected to grading of particle diameter by sieving.
4. After the sieving, particles remaining on the sieve is mainly constituted of coarse particles. Therefore, it is possible to

TABLE 1

| | Si powder | | Flux | | | Maximum | |
| --- | --- | --- | --- | --- | --- | --- | --- |
| | Amount of coating (g/m$^2$) | Maximum particle size (μm) | Composition | Amount of coating (g/m$^2$) | Fin | corrosion depth (μm) | Remark |
| Example 1 | 1 | 10 | KZnF$_3$ | 5 | JIS3003 | 75 | — |
| Example 2 | 3 | 10 | KZnF$_3$ | 10 | JIS3003 | 70 | — |
| Example 3 | 5 | 10 | KZnF$_3$ | 15 | JIS3003 | 80 | — |
| Example 4 | 5 | 10 | KZnF$_3$ | 20 | JIS3003 | 75 | — |
| Example 5 | 3 | 10 | ZnCl$_2$ + KAlF$_4$ | 10 + 10 | JIS3003 | 95 | — |
| Example 6 | 3 | 35 | KZnF$_3$ | 10 | JIS3003 | 80 | somewhat deep erosion |
| Comparative Example 1 | 3 | 10 | KAlF$_4$ | 10 | JIS3003 | 350 | — |
| Comparative Example 2 | 3 | 10 | KZnF$_3$ + KAlF$_4$ | 2 + 10 | JIS3003 | 300 | — |
| Comparative Example 3 | — | — | ZnF$_2$ | 10 | JIS3003/JIS4045 | 175 | — |
| Comparative Example 4 | — | — | KZnF$_3$ | 20 | JIS3003/JIS4045 | 200 | — |

As shown in Table 1, maximum corrosion depth was less than 100 μm in any of the finned tubes of Examples 1 to 6, indicating that corrosion of the tubes was suppressed. Example 6 showed a little deeper erosion because of larger maximum particle size of the Si powder.

Extent of corrosion was larger in the comparative examples, presumably because Zn was not added to the flux in Comparative Example 1, smaller amount (2 g/m$^2$) of the Zn-containing flux (KZnF$_3$) was added in Comparative Example 2, and Zn was distributed unevenly since Si powder was not added in the comparative examples 3 and 4.

Examples B

Multi-bore extruded tubes each having a dimension of 1.5 mm in height, 14 mm in width, 500 mm in length, and 0.4 mm in wall thickness were produced by extrusion of aluminum alloy having a composition of Al-0.3% Si-0.3% Fe-0.3% Mn-0.05% Ti. 39 tubes were prepared. Coating in an amount of 9.5 g/m$^2$ of powdered brazing composition containing a Si powder, a KZnF$_3$ flux, an acrylic resin binder was applied on the surface of each tube, where fraction of each component was controlled such that Si powder:KZnF$_3$ flux:acrylic analyze particle diameter distribution using the laser diffraction type particle diameter analyzer.
5. By adding a necessary amount of the above-described coarse Si particles to the Si powder having a particle diameter of a certain diameter or less, Si powder containing a desired amount of coarse Si particles is prepared.
6. By the above-described process, it is possible to control the amount of coarse Si powder to be a calculated value.

Si powders of the thus controlled particle diameter distribution were used in the testing.

The 39 tubes subjected to heating process equivalent to brazing at 600° C. for 2.5 minutes were subjected to SWAAT test for 11 days, and maximum depth of corrosion generated in the coated portion was measured by focal depth method.

With respect to the thus obtained Examples B1 to B36 and Comparative Examples B1 to B3, amount of Si powder in the coating (flux layer), 99% particle diameter of the Si powder, amount of coarse Si particles having a diameter of not smaller than 5 times ($D_{99}$), ratio of $(D_{50})/(D_{99})$ of the Si powder, amount of KZnF$_3$ flux in the coating, maximum depth of corrosion, and numbers of corroded portions having a depth of 120 μm or more measured as a result of corrosion test of each tube are shown in the below Tables 2 and 3.

TABLE 2

|  | Si powder | | | | Flux | | | Maximum corrosion depth ($\mu m$) | Numbers of corrosion having a depth of 120 $\mu m$ or more |
|---|---|---|---|---|---|---|---|---|---|
|  | Amount ($g/m^2$) | $D_{99}$ ($\mu m$) | Amount of $D_{coarse}$ (ppm) | $D_{50}/D_{99}$ | Composition | Amount ($g/m^2$) | Fin | | |
| Example B1 | 2 | 5 | 0.02 | 0.3 | $KZnF_3$ | 15 | JIS3003 | 85 | 0 |
| Example B2 | 3 | 10 | 0.05 | 0.35 | $KZnF_3$ | 5 | JIS3003 | 90 | 0 |
| Example B3 | 3 | 20 | 0.02 | 0.4 | $KZnF_3$ | 3 | JIS3003 | 95 | 0 |
| Example B4 | 4 | 5 | 0.02 | 0.3 | $KZnF_3$ | 6 | JIS3003 | 91 | 0 |
| Example B5 | 2.5 | 10 | 0.05 | 0.35 | $KZnF_3$ | 15 | JIS3003 | 93 | 0 |
| Example B6 | 4 | 20 | 0.02 | 0.4 | $KZnF_3$ | 15 | JIS3003 | 98 | 0 |
| Example B7 | 3 | 10 | 0.01 | 0.35 | $KZnF_3$ | 20 | JIS3003 | 74 | 0 |
| Example B8 | 2.5 | 10 | 0.1 | 0.35 | $KZnF_3$ | 3 | JIS3003 | 130 | 1 |
| Example B9 | 3 | 10 | 0.5 | 0.35 | $KZnF_3$ | 6 | JIS3003 | 125 | 4 |
| Example B10 | 3 | 10 | 0.9 | 0.35 | $KZnF_3$ | 4 | JIS3003 | 125 | 8 |
| Example B11 | 1 | 20 | 0.05 | 0.04 | $KZnF_3$ | 5 | JIS3003 | 125 | 20 |
| Example B12 | 2.5 | 20 | 0.02 | 0.05 | $KZnF_3$ | 10 | JIS3003 | 95 | 0 |
| Example B13 | 3.5 | 20 | 0.02 | 0.5 | $KZnF_3$ | 5 | JIS3003 | 84 | 0 |
| Example B14 | 3.5 | 20 | 0.01 | 0.7 | $KZnF_3$ | 15 | JIS3003 | 92 | 0 |
| Example B15 | 3 | 20 | 0.05 | 0.8 | $KZnF_3$ | 8 | JIS3003 | 131 | 0 |
| Example B16 | 1.5 | 5 | 0.02 | 0.3 | $KZnF_3$ | 3 | JIS3003 | 115 | 0 |
| Example B17 | 1.5 | 10 | 0.05 | 0.35 | $KZnF_3$ | 5 | JIS3003 | 100 | 0 |
| Example B18 | 1.5 | 15 | 0.03 | 0.4 | $KZnF_3$ | 15 | JIS3003 | 90 | 0 |
| Example B19 | 1.5 | 20 | 0.02 | 0.4 | $KZnF_3$ | 10 | JIS3003 | 92 | 0 |

Remark:
$D_{coarse}$ denotes particles having a diameter of 5 times ($D_{99}$) or more.

TABLE 3

|  | Si powder | | | | Flux | | | Maximum corrosion depth ($\mu m$) | Numbers of corrosion having a depth of 120 $\mu m$ or more |
|---|---|---|---|---|---|---|---|---|---|
|  | Amount ($g/m^2$) | $D_{99}$ ($\mu m$) | Amount of $D_{coarse}$ (ppm) | $D_{50}/D_{99}$ | Composition | Amount ($g/m^2$) | Fin | | |
| Example B20 | 1.5 | 20 | 0.02 | 0.4 | $KZnF_3$ | 10 | JIS3003 | 92 | 0 |
| Example B21 | 1.5 | 10 | 0.05 | 0.35 | $KZnF_3$ | 20 | JIS3003 | 80 | 0 |
| Example B22 | 2.5 | 15 | 0.03 | 0.4 | $KZnF_3$ | 20 | JIS3003 | 78 | 0 |
| Example B23 | 2.5 | 5 | 0.02 | 0.3 | $KZnF_3$ | 5 | JIS3003 | 110 | 0 |
| Example B24 | 3 | 5 | 0.02 | 0.3 | $KZnF_3$ | 15 | JIS3003 | 97 | 0 |
| Example B25 | 4.5 | 5 | 0.02 | 0.3 | $KZnF_3$ | 3 | JIS3003 | 110 | 0 |
| Example B26 | 4.5 | 10 | 0.05 | 0.35 | $KZnF_3$ | 5 | JIS3003 | 88 | 0 |
| Example B27 | 4.5 | 15 | 0.03 | 0.4 | $KZnF_3$ | 10 | JIS3003 | 90 | 0 |
| Example B28 | 4.5 | 20 | 0.02 | 0.4 | $KZnF_3$ | 15 | JIS3003 | 80 | 0 |
| Example B29 | 4.5 | 15 | 0.03 | 0.4 | $KZnF_3$ | 20 | JIS3003 | 85 | 0 |
| Example B30 | 2 | 15 | 0.03 | 0.4 | $KZnF_3$ | 20 | JIS3003 | 80 | 0 |
| Example B31 | 2 | 20 | 0.02 | 0.4 | $KZnF_3$ | 10 | JIS3003 | 90 | 0 |
| Example B32 | 3 | 15 | 0.03 | 0.4 | $KZnF_3$ | 14 | JIS3003 | 87 | 0 |
| Example B33 | 3.5 | 5 | 0.02 | 0.3 | $KZnF_3$ | 20 | JIS3003 | 81 | 0 |
| Example B34 | 3.5 | 10 | 0.05 | 0.35 | $KZnF_3$ | 10 | JIS3003 | 88 | 0 |
| Example B35 | 3.5 | 15 | 0.03 | 0.4 | $KZnF_3$ | 3 | JIS3003 | 115 | 0 |
| Example B36 | 4 | 10 | 0.05 | 0.35 | $KZnF_3$ | 3 | JIS3003 | 110 | 0 |
| Comparative B1 | 3 | 2 | 0.05 | 0.3 | $KZnF_3$ | 2 | JIS3003 | 140 | not measured |
| Comparative B2 | 5 | 30 | 0.01 | 0.4 | $KZnF_3$ | 1.7 | JIS3003 | 185 | not measured |
| Comparative B3 | 2 | 10 | 1 | 0.35 | $KZnF_3$ | 4 | JIS3003 | 160 | not measured |

As shown in Table 2, 3, in each of the tubes of Examples B1 to B36 brazed with the fins, numbers of generation of corrosion pits having a depth of 120 $\mu m$ or more were 20 or less. That is, practical corrosion protection effect was ensured.

In the Comparative Examples B1 to B3, maximum depth of corrosion was 140 $\mu m$ or more. Since the unsatisfactory corrosion protection was obvious, numbers corrosion pits having a depth of 120 $\mu m$ or more were not measured in the Comparative Examples B1 to B3.

In the Comparative Example B1, granulation occurred because of small ($D_{99}$). In addition, amount of Zn containing flux was small. As a result, maximum corrosion depth had a large value of 140 $\mu m$.

In the Comparative Example B2, aggregation occurred because of large ($D_{99}$). In addition, amount of Zn containing flux was small. As a result, maximum corrosion depth had a large value of 185 $\mu m$.

As described in detail above, in the heat exchanger tube of the present invention, since the mixture of the Si powder and the Zn-containing flux is applied, the Si powder melts and turns into a brazing liquid during a brazing process, while Zn contained in the flux is diffused uniformly in the brazing liquid and is distributed uniformly over the tube surface. Since diffusion velocity of Zn in a liquid phase such as the brazing liquid is significantly higher than diffusion velocity in a solid phase, Zn concentration in the tube surface becomes substantially uniform, thus making it possible to form a uniform sacrificial anode layer and improve the corrosion resistance of the heat exchanger tube.

Since the amount of the Zn-containing flux is in a range not less than 5 g/m$^2$ and not more than 20 g/m$^2$, Zn can be distributed uniformly over the tube surface.

In addition, by controlling the particle diameter distribution of the Si powder, it is possible to form uniform distribution of Zn on the tube surface even when the amount of Zn containing flux is 3 g/m$^2$ or more and 20 g/m$^2$ or less.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A heat exchanger tube precursor comprising an Al alloy extruded tube, and a flux layer including a Si powder, a Zn-containing flux, and a binder formed on an outer surface of the Al alloy extruded tube, wherein an amount of the Si powder applied on the Al alloy extruded tube is in a range of 1 g/m$^2$ or more and 5 g/m$^2$ or less, an amount of the Zn containing flux applied on the Al alloy extruded tube is in a range of 3 g/m$^2$ or more and 20 g/m$^2$ or less, and the Si powder has a particle diameter distribution such that 99% particle diameter ($D_{99}$) is 5 μm or more and 20 μm or less, and an amount of coarse particles having diameters of not smaller than 5 times ($D_{99}$) is less than 1 ppm by volume, where ($D_{99}$) denotes a critical diameter defined such that cumulative volume of particles not larger than ($D_{99}$) constitute 99% by volume of all the particles, wherein 50% particle diameter ($D_{50}$) of the Si powder is ($D_{99}$)×0.05 or more and ($D_{99}$)×0.7 or less, where ($D_{50}$) denotes a critical diameter defined such that cumulative volume of particles not larger than ($D_{50}$) constitute 50% by volume of all the particles.

2. A heat exchanger tube precursor according to claim 1, wherein the Zn-containing flux contains at least one selected from $ZnF_2$, $ZnCl_2$, and $KZnF_3$.

3. A heat exchanger tube precursor according to claim 1, wherein the Al alloy extruded tube is constituted of an alloy containing Si of 0.05% or more and 1.0% or less by weight, Mn of 0.05% or more and 1.2% or less by weight, and the balance being consisting of Al and inevitable impurities.

4. A heat exchanger tube precursor according to claim 2, wherein the Al alloy extruded tube is constituted of an alloy containing Si of 0.05% or more and 1.0% or less by weight, Mn of 0.05% or more and 1.2% or less by weight, and the balance being consisting of Al and inevitable impurities.

* * * * *